United States Patent
Luyster et al.

(10) Patent No.: US 10,253,242 B2
(45) Date of Patent: Apr. 9, 2019

(54) BREAKER AND DISPLACEMENT FLUID

(71) Applicant: M-I L.L.C., Houston, TX (US)

(72) Inventors: Mark R. Luyster, Houston, TX (US); LaTosha Moore, Richmond, TX (US); Andrew G. K. Jones, Cape Town (ZA)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/352,163

(22) Filed: Nov. 15, 2016

(65) Prior Publication Data

US 2017/0058183 A1 Mar. 2, 2017

Related U.S. Application Data

(62) Division of application No. 13/807,679, filed as application No. PCT/US2011/042651 on Jun. 30, 2011, now Pat. No. 9,493,697.

(60) Provisional application No. 61/360,063, filed on Jun. 30, 2010.

(51) Int. Cl.
| | | |
|---|---|---|
| *C09K 8/52* | (2006.01) | |
| *E21B 37/00* | (2006.01) | |
| *C09K 8/524* | (2006.01) | |
| *C09K 8/528* | (2006.01) | |
| *C09K 8/86* | (2006.01) | |
| *E21B 37/06* | (2006.01) | |

(52) U.S. Cl.
CPC .............. *C09K 8/52* (2013.01); *C09K 8/524* (2013.01); *C09K 8/528* (2013.01); *C09K 8/86* (2013.01); *E21B 37/00* (2013.01); *E21B 37/06* (2013.01); *C09K 2208/32* (2013.01)

(58) Field of Classification Search
None
See application file for complete search history.

(56) References Cited

U.S. PATENT DOCUMENTS

| 7,928,040 B2 * | 4/2011 | Sanders | C09K 8/524 |
| | | | 166/305.1 |
| 2008/0200354 A1 * | 8/2008 | Jones | C09K 8/524 |
| | | | 507/244 |
| 2011/0272160 A1 * | 11/2011 | Arvie, Jr. | C09K 8/524 |
| | | | 166/311 |

FOREIGN PATENT DOCUMENTS

| WO | 2006/108044 A1 | 10/2006 |
| WO | 2008/103551 A2 | 8/2008 |
| WO | 2009/006326 A2 | 1/2009 |
| WO | 2010/056779 A2 | 5/2010 |

OTHER PUBLICATIONS

EPO Communication pursuant to Article 94(3) EPC dated Sep. 11, 2018, issued by the European Patent Office in corresponding European Patent Application No. EP-11801432.3 (6 pages).

* cited by examiner

*Primary Examiner* — John J Figueroa
(74) *Attorney, Agent, or Firm* — Osha Liang LLP

(57) ABSTRACT

A breaker fluid for breaking a filtercake in a wellbore. The fluid including a hydrolysable ester of carboxylic acid, and a chelant, an alkyl glycoside, or a combination thereof. The breaker fluid may be pre-mixed and include an amount of water less than required to completely hydrolyze the ester.

10 Claims, No Drawings

BREAKER AND DISPLACEMENT FLUID

This application is a divisional filed pursuant to 35 U.S.C. § 121 of U.S. patent application Ser. No. 13/807,679, filed on Apr. 29, 2013, which is a National Stage Entry of PCT/US2011/042651, filed on Jun. 30, 2011, which is incorporated by reference in its entirety.

BACKGROUND OF INVENTION

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

In most subterranean drilling procedures the drilling fluid takes the form of a "mud," i.e., a liquid having solids suspended therein. The solids function to impart desired properties to the drilling fluid such as to increase the density thereof in order to provide a suitable hydrostatic pressure at the bottom of the well. The drilling mud may be either a water-based or an oil-based mud. One of skill in the art should appreciate that an oil-based mud is typically based on a combination of oil and water in the form of an invert (water in oil) emulsion.

Drilling muds may further include polymers, biopolymers, clays and organic colloids to obtain the required viscous and filtration properties. Heavy minerals, such as barite, manganese oxides, hematite, iron oxides, calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that affect the rheological properties (e.g., plastic viscosity, yield point value, gel strength) of the drilling mud, and polymeric thinners and flocculants.

Polymeric additives included in the drilling fluid may act as fluid loss control agents. Fluid loss control agents, such as starch, xanthan gums, synthetic polymers and the like are designed to prevent the loss of fluid to the surrounding subterranean formation by reducing the permeability of filter cakes formed on the newly exposed rock surface. In addition, polymeric additives may be employed to impart sufficient carrying capacity and thixotropy to the mud to enable the mud to transport the cuttings up to the surface and to prevent the cuttings from settling out of the mud when circulation is interrupted.

Many drilling fluids may be designed to form a thin, low-permeability filter cake to seal permeable subterranean formations penetrated by the drill bit. The filter cake is essential to prevent or reduce both the loss of fluids into the subterranean formation and the influx of fluids present in the subterranean formation. Upon completion of drilling, the filter cake may stabilize the wellbore during subsequent completion operations such as placement of a gravel pack in the wellbore. Filter cakes often comprise bridging particles, cuttings created by the drilling process, polymeric additives, and precipitates. One feature of a drilling fluid is to retain these solid and semi-solid particles as a stable suspension, free of significant settling over the time scale of drilling operations.

The selection of the type of drilling fluid to be used in a drilling application involves a careful balance of both the good and bad characteristics of the drilling fluids in the particular application and the type of well to be drilled. The primary benefits of selecting an oil-based drilling fluid, also known as an oil-based mud, include: superior hole stability, especially in shale formations, formation of a relatively thinner filter cake than the filter cake achieved with a water-based mud, excellent lubrication of the drilling string and downhole tools, and penetration of salt beds without sloughing or enlargement of the hole, as well as other benefits that should be known to one of skill in the art.

An especially beneficial property of oil-based muds is their excellent lubrication qualities. These lubrication properties permit the drilling of wells having a significant deviation from vertical, as is typical of off-shore or deep water drilling operations or when a horizontal well is desired. In such highly deviated holes, torque and drag on the drill string are a significant problem because the drill pipe lies against the low side of the hole. Often the torque that must be applied to die drill string is high when water-based muds are used. In contrast, oil-based muds provide a thin, slick filter cake that helps to reduce the torque on the drill pipe, and thus the use of the oil-based mud can be justified.

Despite the many benefits of using oil-based muds, they have disadvantages. In general, the use of oil-based drilling fluids and muds have high initial and operational costs. These costs can be significant depending on the diameter and depth of the hole to be drilled. However, the higher costs can often be justified if the oil-based drilling fluid prevents the caving in or hole enlargement that can greatly increase drilling time and costs.

Disposal of oil-coated drilling cuttings is another primary concern, especially for off-shore or deep-water drilling operations. In these latter cases, the cuttings must be either washed clean of the oil with a detergent solution that also must be disposed, or the cuttings must be shipped back to shore for disposal in an environmentally safe manner. Another consideration that must be taken into account is the local governmental regulations that may restrict the use of oil-based drilling fluids and muds for environmental reasons.

Oil-based muds typically contain some water, either from the formulation of the drilling fluid itself, or water may be intentionally added to affect the properties of the drilling fluid or mud. In such water-in-oil type emulsions, also known as invert emulsions, an emulsifier is used to stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of ordinary skill in the art.

After any completion operations have been accomplished, removal of filter cake (be it water based or oil based) remaining on the sidewalls of the wellbore may be necessary. Although filter cake formation is essential to drilling operations, the filter cake can be a significant impediment to the production of hydrocarbon or other fluids from the well if, for example, the rock formation is plugged by the filter cake. The filter cake can also be a significant impediment to using the well as an injection well through which gas (nitrogen, carbon dioxide, natural gas and the like) or aqueous fluids may be injected into the formation in a secondary or tertiary recovery process. Because filter cake is compact, it often adheres strongly to the formation and may not be readily or completely flushed off of the face of the formation by fluid action alone.

The removal of water-based filter cake has been conventionally achieved with water based treatments that include: an aqueous solution with an oxidizer (such as persulfate), a hydrochloric acid solution, organic (acetic, formic) acid, combinations of acids and oxidizers, and aqueous solutions containing enzymes. For example, the use of enzymes to remove filter cake is disclosed in U.S. Pat. No. 4,169,818. Chelating agents (e.g., EDTA) have also been used to promote the dissolution of calcium carbonate. According to traditional teachings, the oxidizer and enzyme attack the polymer fraction of the filter cake and the acids typically attack the carbonate fraction (and other minerals). Generally, oxidizers and enzymes are ineffective in breaking up the carbonate portion, and acid are ineffective on the polymer portions.

One of the most problematic issues facing filter cake removal involves the formulation of the clean-up solutions. For example one of the more common components in a filter cake is calcium carbonate, a clean-up solution would ideally include hydrochloric acid, which reacts very quickly with calcium carbonate. However, while effective in targeting calcium carbonate, such a strong acid is also reactive with any calcium carbonate in the formation (e.g., limestone), and it may be reactive or chemically incompatible with other desirable components of the clean-up solution. Further the clean-up solution can permeate into the formation, resulting in unanticipated losses, damage to the formation that subsequently result in only a partial clean-up or loss of well control.

The use of traditional emulsifiers and surfactants in the invert drilling fluid systems that formed the filter cake can further complicate the clean-up process in open-hole completion operations. Specifically, fluids using traditional surfactant and emulsifier materials may require the use of solvents and other surfactant washes to penetrate the oil-based filter cake and reverse the wettability of the residual particles. Invert emulsion drilling fluids that exhibit an acid induced phase change reaction have been previously described in U.S. Pat. Nos. 6,218,342, 6,790,811, and 6,806,233 and U.S. Patent Publication No. 2004/0147404, the contents of which are incorporated by reference in their entirety. The fluids disclosed in these references all contain one form or another of an ethoxylated tertiary amine compound that stabilizes the invert emulsion when it is not protonated. Upon protonation of the amine compound, the invert emulsion reverses and becomes a regular emulsion. In most cases, deprotonation of the amine compound allows for the reformation of an invert emulsion. The clean-up of wells drilled with this invert emulsion drilling fluid may be simplified by using a wash fluid that contains an acid in a concentration sufficient to protonate the amine surfactant in the drilling fluid (and hence the filter cake).

Weighting agents are utilized to increase the density of the clean up solutions. The weighting agents enable the solutions to match the density of the drilling fluid and provide sufficient hydrostatic head so that the well can remain under control. High density brines containing salts of alkali and alkaline earth metals are examples of such weighting agents.

One drawback to the using so many different chemicals is the need to mix them at the wellsite. Mixing fluids at the wellsite is typically more expensive and inconvenient than offsite mixing. Space and facilities are limited at the wellsite. Consequently, there is a need for clean-up fluids that minimize the need to mix chemicals at the wellsite.

Unintended side effects can also arise from combining the various chemicals used to form the clean-up solutions and using these solutions downhole to remove filter cakes. One such side effect is precipitation in the wellbore. When precipitants form in the wellbore, they can clog the pumps and equipment intended to circulate the fluids and remove the filter cake. Calcium formate is one example of a precipitant that may form in processes for removing filter cakes. Accordingly, there also exists a need for effective clean-up solutions and processes that avoid the formation of precipitants.

SUMMARY

In one aspect, various embodiments relate to breaker fluid. In another aspect, various embodiments relate to a method of breaking a filtercake in a wellbore, wherein potentially problematic precipitation is avoided.

In various embodiments, the breaker fluid includes a hydrolysable ester of carboxylic acid and a chelant. The breaker fluid may be essentially free of water or include an amount of water less than required to completely hydrolyze all the ester. In some embodiments, the fluid includes an amount of water wherein the weight ratio of water to hydrolysable ester of carboxylic acid is less than 1.3.

In other embodiments, the breaker fluid comprises includes a hydrolysable ester of carboxylic acid and an alkyl glycoside. 1. some embodiments the breaker fluid may include a terpene.

In various embodiments, the method of breaking a filtercake in a wellbore comprising circulating a pre-mixed breaker fluid to the wellbore. The pre-mixed breaker fluid comprises a hydrolysable ester of carboxylic acid, a chelant, and an amount of water less than required to hydrolyze all the ester of carboxylic acid. In one embodiment, the amount of water in the pre-mixed breaker fluid is such that the weight ratio of water to hydrolysable ester of carboxylic acid is less than 1.3. The method further comprises circulating an aqueous fluid to the wellbore.

In other embodiments, the method of breaking a filtercake comprises circulating a breaker fluid comprising a hydrolysable ester of carboxylic acid and an alkyl glycoside.

Other aspects and advantages of the invention will be apparent from the following description and the appended claims.

DETAILED DESCRIPTION

Breaker fluids including a hydrolysable ester of carboxylic acid are effective for removing the filtercakes formed by oil based drilling muds in a wellbore. The hydrolysable esters are selected so that upon hydrolysis an organic acid is released and the invert emulsion of the filter cake breaks. One drawback of using hydrolysable ester of carboxylic acid in the breaker is that when the breaker is used in a divalent brine, calcium formate precipitation may occur.

A chelant added to the wellbore has been found to dissolve the calcium formate. Unfortunately, a breaker fluid including both a chelant and a hydrolysable ester of carboxylic acid tends to be less effective at removing filter cakes. Without being bound by a particular theory, the reason for the decreased effectiveness is believed to be that free water in commercially available chelant solutions initiates premature hydrolysis of the ester of carboxylic acid. Therefore, the chelant and hydrolysable ester of carboxylic acid must be packaged and shipped separately, and combined at the wellsite.

In one aspect, embodiments disclosed herein are generally directed to chemical breaker and displacement fluids that are useful in the drilling, completing, and working over of subterranean wells, preferably oil and gas wells. In another aspect, embodiments disclosed herein are generally directed to the formulation of a breaker fluid.

In one embodiment, the breaker fluid includes a hydrolysable ester of carboxylic acid and a chelant. The breaker fluid may include an amount of water less than required to completely hydrolyze all the ester. In another embodiment, the fluid includes an amount of water wherein the weight ratio of water to hydrolysable ester of carboxylic acid is less than 1.3. The 1.3 ratio of water to hydrolysable ester of carboxylic acid is approximately the amount of water that would hydrolyze all the ester in the breaker fluid.

Water may exist in two states in the breaker fluid, free water and bound water. Free water is the water molecules that are not bound to a salt. Free water molecules may react to hydrolyze the ester of carboxylic acid, while water molecules that are bound to a salt are prevented from hydrolyzing the ester. In one embodiment, the breaker fluid may be essentially free of free water. The absence of free water at or near the time breaker fluid is formed, i.e. within 24 hours of mixing, avoids pre-mature hydrolysis of the ester of carboxylic acid while storing the breaker fluid. In other embodiments, the breaker fluid may include some free water at the time of manufacture, so long as the amount of free water is less than required to completely hydrolyze the ester of carboxylic acid. In still another embodiment, the total water content of the breaker fluid, including both free and bound water, is between 0 wt %-10 wt % water.

The hydrolysable ester should be selected so that the time to achieve hydrolysis is predetermined on the known downhole conditions, such as temperature. It is well known in the art that temperature, as well as the presence of a hydroxide ion source, has a substantial impact on the rate of hydrolysis of esters. For a given acid, for example formic acid, one of skill in the art can conduct simple studies to determine the time to hydrolysis at a given temperature. It is also well known that as the length of the alcohol portion of the ester increases, the rate of hydrolysis decreases. Thus, by systematically varying the length and branching of the alcohol portion of the ester, the rate of release of the formic acid can be controlled and thus the breaking of the emulsion of an invert emulsion filter cake can be predetermined. In one embodiment, the hydrolysable ester of a carboxylic acid is a formic acid ester of a C2 to C30 alcohol. In another embodiment the hydrolysable ester is C1 to C6 carboxylic acid and a C2 to C30 poly alcohol including alkyl orthoesters may be used. In yet another embodiment, the hydrolysable ester of carboxylic acid is ethanediol monoformate. In still another embodiment, the hydrolysable ester may be combined with a solvent. Examples such solvents include organic solvents such as ethylene glycol. When ethanediol monoformate is combined with ethylene glycol solvent, the resulting solution may also include the hydrolysable esters of carboxylic acid ethylene glycol monoformate and ethylene glycol diformate. One example of a suitable hydrolysable ester of carboxylic acid is available from M-I, L.L.C. (Houston, Tex.) under the name D-STRUCTOR, which is referred to herein as ECF-974.

The chelant should be selected so that precipitated calcium formate is dissolved. In one embodiment, the chelant comprises at least one iminodiacetic acid or a salt thereof. The iminodiacetic acids (and salts thereof) for use in the present invention are at least one or more of the compounds represented by the following formula (I) and are synthesized as a corresponding amino acid or amino alcohol derivative using known methods:

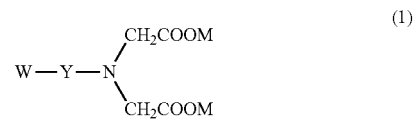

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group. In the iminodiacetic acids (salts) represented by formula I, the —COOM group is preferably a carboxyl group or an alkali metal salt or ammonium salt thereof. The alkali metal atom is sodium or potassium. Examples of groups represented by Y in formula I are set forth below.

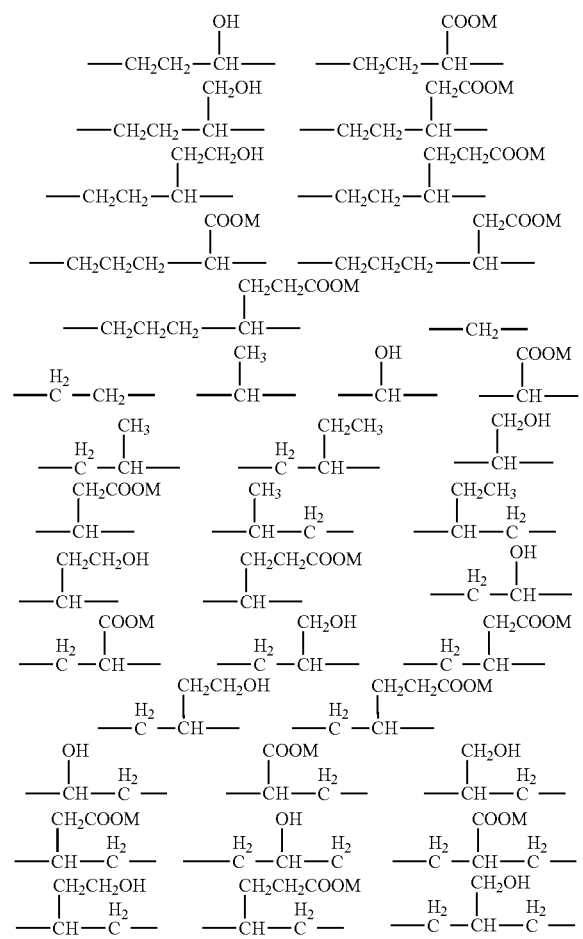

-continued

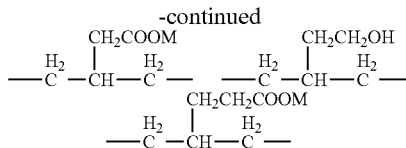

Examples of iminodiacetic acids (salts) include .alpha.-alanine-N,N-diacetic acid (salt), .beta.-alanine-N,N-diacetic acid (salt), aspartic acid-N,N-diacetic acid (salt), glutamic acid-N,N-diacetic acid (salt), serine-N,N-diacetic acid (sail), ethanolamine-N,N-diacetic acid (salt), iminodiacetic acid (salt) and nitrilotriacetic acid (salt). These iminodiacetic acids (sails) are compounds having a chelating ability and are considered to enhance the degradation, dispersion, dissolution or clean-up of the filler cake as a result of complexing with any free calcium ion due to a chelating action. The well bore fluids of the present invention may contain one or more of these iminodiacetic acids (salts). Examples of chelants that may be employed in certain embodiments include ethylenediaminetetraacetic acid (EDTA), glutamic acid, diacetic acid (GLDA) (such as L-glutamic acid, N,N-diacetic acid) and/or salts thereof.

The amount of chelant in the breaker fluid may chosen to mitigate the precipitation of calcium formate in the wellbore. In one embodiment, chelant in the breaker fluid is effective at concentrations of about 5 wt % to about 35 wt %. The breaker fluid's viscosity may substantially increase as chelant concentration increases. In another embodiment, chelant concentration is about 5% to about 25% to avoid a substantial viscosity increase.

In one embodiment, the chelant may be in dry form. A chelant in dry form may include some water, but contains very little free water. The use of dry form chelant is intended to eliminate as much free water as possible from the breaker fluid. The dry form chelant may be a solid. One example of a suitable dry form chelant is a GLDA salt, a Developmental Product CFC 8835, which is available from Akzo Nobel Functional Chemicals, LLC of Chicago, Ill. CFC 8835 is a powdery substance that includes L-glutamic acid, N, N-diacetic acid; L-glutamic acid, N,N-diacetic acid monosodium salt; and up to 15 wt. % water. Another example of chelant is the GLDA salt DISSOLVINE GL (glutamic acid N, N-diacetic acid, tetra sodium salt), which is also available from Akzo Nobel Functional Chemicals, LLC of Chicago, Ill.

In an alternative embodiment, the breaker fluid comprises the hydrolysable ester of carboxylic acid and an alkyl glycoside. The combination of the hydrolysable ester of carboxylic acid and the alkyl glycoside is effective at breaking a filter cake while avoiding the precipitation of significant amounts of insoluble salts, such as calcium formate or zinc formate. Without being bound to a particular theory, it is believed that the alkyl glycoside coats the crystals of calcium formate, blocking them from acting as seed crystals for the further precipitation.

Alkyl glycosides are non-ionic, generally biodegradable surfactants. Glycosides are substituted saccharides in which the substituent group is attached, through an oxygen atom, to the aldehyde or ketone carbon. Accordingly, glycosides are considered acetals. As with the term "saccharide," the term "glycoside" defines neither the number nor the identity of the saccharide units in the molecule. To describe the identity of the saccharide units, it is common to modify the name of the saccharide unit by adding the ending "-side."

For example, a glucoside is a glycoside having one or more glucose units and a fructoside is a glycoside having one or more fructose units.

In some embodiments, alkyl glycoside nonionic surfactants used in accordance with the present disclosure may have the formula RO—(R'O)$_x$Z$_y$, where the letter O represents an oxygen atom and R, R', x, Z, and y are as described below:

R represents a monovalent alkyl radical containing from 6 to 25 carbon atoms. The term "alkyl radical" is used herein to include aliphatic or alicyclic. In other words, the alkyl radical may be straight-chain or branched, saturated or unsaturated, and may contain carbon, hydrogen, oxygen, etc. In a particular embodiment, the alkyl groups are straight-chain saturated hydrocarbon radicals containing 8 to 16 carbon atoms.

R' represents a divalent alkyl radical containing 2 to 4 carbon atoms where the term "alkyl radical" is used as discussed above. The group (R'O) represents an oxy-alkylene repeating unit derived generally from ethylene oxide, propylene oxide, or butylene oxide.

The letter x represents the number of oxy-alkylene units in the alkyl glycoside, and may vary from 0 to about 12. Oxy-alkylene units may be added to an alcohol prior to reaction with the saccharide (discussed below) as a way to obtain or vary the desired chain length for the alkyl portion of the glycoside.

Z represents a reducing saccharide moiety containing 5 or 6 carbon atoms, and y represents the number of saccharide units in the glycoside. The length of a saccharide chain is commonly described either by adding a descriptive prefix to its name (e.g., monosaccharide, disaccharide, etc.) or by stating the chain's "degree of polymerization" (abbreviated as DP) as a numerical value representing the number of saccharide units bonded together to form a chain. Monosaccharides are polyhydroxy aldehydes and polyhydroxy ketones which, when unsubstituted, have the chemical formula $C_nH_{2n}O_n$. Monosaccharides can join together or polymerize, with the loss of water, to form chains of varying lengths and saccharide units. For example, glucose (also known as dextrose) is a monosaccharide (DP=1); sucrose and maltose are disaccharides (DP=2); and starch and cellulose are polysaccharides having (DP=1000 or more).

Thus, glycosides encompass unsubstituted and substituted molecules of any chain length, such as, for example, glucose, galactose, mannose, xylose, arabinose, fructose, etc. as well as materials which are hydrolyzable to form monosaccharides such as lower alkyl glycosides (e.g. a methyl glycoside, an ethyl glycoside, a propyl glycoside, a butyl glycoside, etc.), oligosaccharides (e.g. sucrose, maltose, maltotriose, lactose, xylobiose, melibiose, cellobiose, raffinose, stachyose, etc.) and other polysaccharides. However, the degree of polymerization affects the surface activity of the glycoside (by increasing the hydrophilic portion of the molecule). Generally, surface activity of an alkyl glycoside is maximized when the hydrophilicity of the saccharide chain balances the lipophilicity of the alkyl chain. Thus, in a particular embodiment in which the alkyl groups have 10 to 16 carbon atoms, the average DP may be selected to range from about 1.0 to 5.0, from about 1.2 to 3.0 in another embodiment, and from about 1.3 to 1.8 in yet another embodiment.

Alkyl glycosides may be prepared by reacting an alcohol of the type and chain length which is desired to form the "alkyl" portion of the glycoside of interest with a saccharide reactant (e.g., a monosaccharide such as glycose, xylose, arabinose, galactose, fructose, etc., or a polysaccharide such as starch, hemicellulose, lactose, maltose, melibiose, etc.) or with a glycoside starting material wherein the aglycone portion thereof is different from the alkyl substituent desired for the ultimate alkyl glycoside product of interest. Typically, such reaction is conducted at an elevated temperature and in the presence of an acid catalyst. An example reaction pathway for formation of an alkyl polyglucoside is shown below:

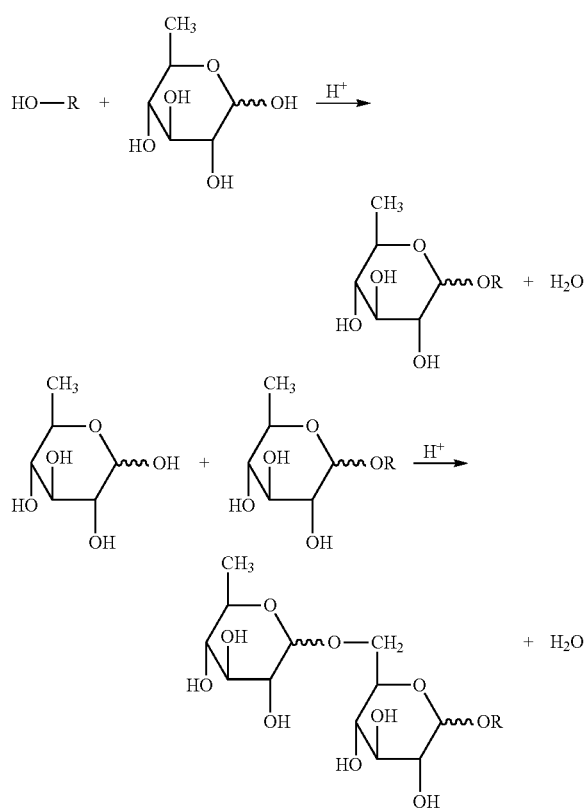

The molar ratio of alcohol to monosaccharide in the reaction mixture can vary widely but is typically between about 1.5:1 to about 10:1, and preferably between about 2.0:1 to about 6.0:1. The particular molar ratio chosen depends upon the desired average degree of polymerization (DP) of the monosaccharide reacted with the alcohol. Preferably, the ratio of alcohol to monosaccharide will be chosen to allow the production of an alkyl glycoside product having a DP between about 1.0 to about 5.0, from about 1.2 to about 3.0 in another embodiment, and from about 1.3 to about 1.8 in yet another embodiment.

The term "HLB" (Hydrophilic Lipophilic Balance) refers to the ratio of the hydrophilicity of the polar groups of the surface-active molecules to the hydrophobicity of the lipophilic part of the same molecules. An HLB value of 0 corresponds to a completely hydrophobic molecule, and a value of 20 would correspond to a molecule made up completely of hydrophilic components. Thus, depending on the alkyl chain length and the DP selected, the HLB may correspondingly vary.

In addition to a hydrolysable ester of carboxylic acid, an alkyl glycoside, and in some embodiments a chelant, the breaker fluid may further include a mutual solvent and/or a terpene. The mutual solvent and/or terpene may be added as individual components of the breaker fluid or as part of the base fluid of alkyl glycoside-containing fluid product added to the breaker fluid. For simplicity however, the various embodiments of these components are frequently discussed herein with reference to their inclusion in the alkyl glycoside-containing fluid product only. In accordance with embodiments of the present disclosure, the alkyl glycoside surfactants discussed above may be used in a base fluid comprising a blend of a base oil and at least one of a mutual solvent or a terpene (to form a stock fluid). Such base oils may include any oleaginous fluids that are substantially the same as or compatible with the oil used as the base for the drilling fluid in the borehole being treated as well as crude oils, distillate oils, fuel oils (e.g., diesel), white oils, silicone oils, mineral oils (paraffinic oils, naphthenic oils, aromatic oils), and natural oils.

Additionally, the base fluid blend may also contain at least one mutual solvent and/or a terpene, such as limonene or terpinol. One example of a suitable mutual solvent may be a glycol ether or glycerol. The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Illustrative examples of such solvents include for example, isopropanol, diethylene glycol monoethyl ether, dipropylene glycol monomethyl ether, tripropylene butyl ether, dipropylene glycol butyl ether, diethylene glycol butyl ether, butylcarbitol, dipropylene glycol methylether, various esters, such as ethyl lactate, propylene carbonate, butylene carbonate, etc, and pyrolidones. In a particular embodiment, the mutual solvent is ethylene glycol monobutyl ether (EGMBE). Further, in a particular embodiment, selection of a mutual solvent may depend on factors such as the type and amount of salt present in the fluid. For example, in a salt-saturated fluid calcium bromide may have greater compatibility with ethylene glycol monobutyl ether while calcium chloride may have greater compatibility with glycerol. One skilled in the art would appreciate that this difference in compatibility may result from the electronegativity difference between various salts, and the relative ability of the solvent to distribute charges. When the base fluid comprises a blend of base oil, mutual solvent, and terpene, the blend may include any ranges up to a blend of 1:2:2. In one embodiment, the blend may range from 1:0.5:0.5 to 1.0:1.5:1.5. Further, when formulated with the alkyl glycoside surfactant, the fluid product to be incorporated in the breaker fluid may include from about 5% to about 40% by volume of surfactant and about 60% to about 95% by volume of the base fluid. In a particular embodiment, the fluid product may include about 10 to 50% by volume of a base oil, about 10 to 45% by volume of a mutual solvent, about 10 to 40% by volume of a terpene, and about 5 to 40% by volume of an alkyl glyscoside. The breaker fluid may include any amount of alkyl glycoside effective to aid in the breaking of the filter cake while avoiding forming significant amounts of precipitate. In some embodiments, the breaker fluid may contain up to 4.35% (v/v) of an alkyl glycoside-containing fluid product, up to 1.75% (v/v) of an alkyl glycoside-containing fluid, up to 0.87% (v/v) of an alkyl glycoside-containing fluid, or up to 0.435% (v/v) of an alkyl glycoside-containing fluid. In some embodiments, the breaker fluid may include amounts of alkyl glycoside up to 1.09% (v/v), up to 0.436% (v/v), up to 0.218% (v/v), up to 0.109% (v/v), 0.109% (v/v)-1.09% (v/v), 0.109% (v/v)-0.436% (v/v), or 0.109% (v/v)-0.0.218% (v/v). In various embodiments wherein the breaker fluid further includes a terpene, such as d-limonene, the terpene may be present in any amount useful to aid in the breaking of a filter cake while avoiding forming significant amounts of precipitate, including, but not limited to, up to 1.05% (v/v) or higher, up to 0.412% (v/v), up to 0.210% (v/v), up to 0.105% (v/v), 0.105% (v/v) 1.05% (v/v), 0.105% (v/v)-0.412% (v/v), or 0.105% (v/v)-0.210% (v/v).

An example of a particular alkyl glycoside-containing fluid (fluid product) that is useful in the breaker fluid includes ECF-2028, an alkyl polyglucoside available from M-I L.L.C. (Houston, Tex.) in ESCAID 110 (a desulfurized hydrogenated kerosene) available from Exxon Company USA (Houston, Tex.)), EGMBE, and d-limonene. This exemplary alkyl glycoside-containing fluid product is herein referred to as ECF-1840 and is available from M-I, LLC (Houston, Tex.) under the tradename DEEPCLEAN.

In still another embodiment, the breaker fluid may comprise the hydrolysable ester of carboxylic acid, the alkyl glycoside, and a chelant. In the various embodiments, the hydrolysable ester, chelant and alkyl glycoside may include, but are not limited, the esters, chelants and alkyl glycosides referenced herein in any combination.

In one aspect, the various embodiments of the method relate to breaking a filtercake in a wellbore. One embodiment of the method includes circulating a breaker fluid to the wellbore, the breaker fluid comprising a hydrolysable ester of carboxylic acid and an alkyl glycoside. The method may further comprise circulating an aqueous fluid, such as a divalent brine.

In another embodiment, the method for breaking a filtercake comprises circulating a pre-mixed breaker fluid to the wellbore. The pre-mixed breaker fluid comprises a hydrolysable ester of carboxylic acid, a chelant, and an amount of water less than required to hydrolyze all the ester of carboxylic acid. In one embodiment, the amount of water in the breaker fluid is such that the weight ratio of water to hydrolysable ester of carboxylic acid is less than 1.3. The method further comprises circulating an aqueous fluid to the wellbore.

The free water content of the pre-mixed breaker fluid is minimized to prevent premature hydrolysis of the ester of carboxylic acid from rendering it ineffective at breaking the filtercake. The pre-mixed breaker fluid may be manufactured at a location remote from the wellsite and shipped in the wellsite in its pre-mixed form.

The pre-mixed breaker fluid and aqueous fluid may be major components in a wellbore fluid to remove filtercake. The breaker fluid and aqueous fluid may be combined prior to being circulated in the wellbore to form the water-based wellbore fluid. But once combined, free water in the aqueous fluid will begin to hydrolyze the hydrolysable ester of carboxylic acid in the breaker fluid. As such, the delay between combining the fluids and circulating them in the wellbore should be monitored to maintain the effectiveness of the breaker fluid. In one embodiment, the pre-mixed breaker fluid and aqueous fluid are combined less than 24 hours before circulating in the wellbore. In another embodiment, the breaker fluid and aqueous fluid are combined less than 10 hours before circulating in the wellbore.

The aqueous fluid may be any water containing fluid that is useful in wellbore applications. In an illustrative embodiment, the aqueous fluid includes a weighting agent. A weighting agent is utilized to increase the density of the overall fluid so as to match that of the drilling fluid and to provide sufficient hydrostatic head; so that the well can remain under control. Frequently, a high density brine containing salts of alkali and alkaline earth metals is used to weight-up the fluids disclosed herein. For example, brines formulated with high concentrations of sodium, potassium, or calcium salts of the halides, formate, acetate, nitrate, and the like; cesium salts of formate, acetate, nitrate, and the like, as well as other compounds that should be well known to one of skill in the art, can be used as solids free weighting agents. The selection of a weighting agent may partially depend upon the desired density of the wellbore fluid, as known by one of ordinary skill in the art. In some embodiments, the aqueous fluid used may be selected from the group including sea water, a brine containing organic and/or inorganic dissolved salts, liquids containing water-miscible organic compounds and combinations thereof and similar compounds that should be known to one of skill in the art. In one embodiment, the aqueous fluid is a divalent brine. Examples of divalent brines useful in various embodiments are $CaCl_2$, $CaBr_2$, $ZnBr_2$, $ZnCaBr_2$ and combinations thereof.

In another embodiment, one or more additives may be circulated with the pre-mixed breaker fluid and aqueous fluid. Alternatively, additives may be included in the pre-mixed breaker fluid manufactured offsite. These additives may be any other components or chemicals useful to or typically found in fluids for breaking operations, displacement fluids, or completion fluids. Additionally, the additives may optionally include a water soluble polar organic solvent, an acidic buffering agent such as mineral acids, organic acids, and compounds that hydrolyze to form acids in situ such as a hydrolysable anhydrides; a viscosifying agent, a weighting agent such as a high density brine solution, scale inhibitors, corrosion inhibitors, mutual solvents and combinations of these and other commonly known agents as disclosed below.

In another embodiment, the additives may include components typically found in invert emulsion based wellbore fluids. The invert emulsion based wellbore fluids may include a non-oleaginous internal phase and an oleaginous external phase. The non-oleaginous internal phase may include at least one iminodiacetic acid (or salt thereof) and may further include a water soluble polar organic solvent, an acidic buffering agent such as mineral acids, organic acids, and compounds that hydrolyze to form acids in situ such as a hydrolysable anhydride, a weighting agent such as a high density brine solution, a viscosifying agent, and combinations of these and other commonly known agents. The oleaginous external phase may include an oleaginous fluid such as diesel or other suitable hydrocarbon or synthetic oil, and an emulsifier. Optionally other components may include a wetting agent, corrosion inhibitors, scale inhibitors, cleaning solvents and other such compounds as should be known to one of skill in the art.

The oleaginous fluid used for formulating the invert emulsion fluids may be liquids and are more preferably a natural or synthetic oil and more preferably, the oleaginous fluid is selected from the group including diesel oil, mineral oil, synthetic oils such as ester based synthetic oils, polyolefin based synthetic oils (i.e. saturated and unsaturated polyalpha olefin, saturated and unsaturated long chain internal olefins), polydiorganosiloxanes, siloxanes or organosiloxanes, and mixtures thereof and similar compounds that should be known to one of skill in the art. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

The non-oleaginous fluid used in the formulation of the invert emulsion based fluids is a liquid and preferably is an aqueous liquid. More preferably, the non-oleaginous fluid may be selected from the group including sea water, a brine containing organic and/or inorganic dissolved salts, liquids containing water-miscible organic compounds and combinations thereof and similar compounds that should be known to one of skill in the art. The amount of the non-oleaginous fluid is typically less than the theoretical limit needed for forming an invert emulsion. In various embodiments, the amount of non-oleaginous liquid is at least about 1, preferably at least about 5, and more preferably greater than about 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume and preferably from about 1% to about 70% by volume. In another embodiment, the non-oleaginous fluid is preferably from about 10% to about 60% by volume of the invert emulsion fluid.

As noted above a number of other components may be included in the formulation of the fluids disclosed herein. In selecting these other components, one must take into account the type of fluid being created (i.e. water-based v. invert emulsion based), the components of the filter cake that is to be removed, the downhole conditions, etc. . . . . . Routine laboratory testing will provide guidance as to which components are helpful or detrimental to achieving the desired results.

In embodiments, where a water soluble polar organic solvent (also referred to as a mutual solvent) is utilized, the water soluble polar organic solvent should be at least partially soluble in an oleaginous fluid, but should also have partial solubility in an aqueous fluid. The polar organic solvent component may be a mono-hydric, di-hydric or poly-hydric alcohol or a mono-hydric, di-hydric, or poly-hydric alcohol having poly-functional groups. Examples of such compounds include aliphatic diols (i.e., glycols, 1,3-diols, 1,4-diols, etc.), aliphatic poly-ols (i.e., tri-ols, tetra-ols, etc.), polyglycols (i.e., polyethylenepropylene glycols, polypropylene glycol, polyethylene glycol, etc.), glycol ethers (i.e., diethylene glycol ether, triethylene glycol ether, polyethylene glycol ether, etc.) and other such similar compounds that may be found useful in the practice of the various embodiments. In one embodiment, the water soluble organic solvent is a glycol or glycol ether, such as ethylene glycol mono-butyl ether (EGMBE). Other glycols or glycol ethers may be used so long as they are at least partially miscible with water.

The acidic buffering agent is utilized in some embodiments to enhance the solubility of the filtercake solids and chelated compounds that may form when using the fluids disclosed herein. Suitable acid buffing agents are those agents that can maintain the pH of the aqueous phase such that the formation of precipitates, especially precipitates of the iminodiacetic acids (salts), does not take place. For example when glutamic acid-N,N-diacetic acid (salt) is utilized, the pH of the aqueous phase should be maintained below a level of about 3 in order to avoid the formation of calcium glutamic acid-N,N-diacetic acid precipitate. Routine laboratory testing and observation along with consultation with the known literature properties of the iminodiacetic acids (salts) will lead one of skill in the art to a determination of this pH level for each of the iminodiacetic acids (salts) compounds disclosed. For example, the desired level of pH can be routinely determined in the laboratory prior to field use by simply titrating sufficient acid into the fluid so as to avoid formation of a precipitate. A wide variety of acidic and acid generating materials may be utilized as acidic buffering agents. Illustrative examples of such acidic buffering agents include mineral acids, such as hydrochloric acid, hydrobromic acid, nitric acid, sulfuric acid, phosphoric acid and mixtures of these, organic acids such as carboxylic acids such as formic, acetic, proprionic, butyric acids, as well as fatty acids in the C5 to C30 range, haloacetic acids, alkyl phosphonic acids, alkyl sulfonic acids and the like. In one embodiment a mixture of mineral and organic acids are utilized, such as hydrochloric acid and formic acid. In addition, compounds that hydrolyze to form acids in situ may be utilized as acid buffing agents. Illustrative examples of such compounds include hydrolysable anhydrides of carboxylic acids, hydrolysable esters of carboxylic acids; hydrolysable esters of phosphonic acid, hydrolysable esters of sulfonic acid and other similar hydrolysable compounds that should be well known to those skilled in the art.

The emulsifier used in the formulation of the illustrative invert emulsion wellbore fluid will be selected so as to form a stable invert emulsion. The selection of the emulsifier may be such that the invert emulsion breaks with time and/or upon application of heat. For example the emulsifier may be selected such that when the pH of the invert emulsion's non-oleaginous phase changes, the emulsifier's hydrophilic-lipophilic balance (HLB) value is sufficiently shifted to destabilize the invert emulsion. One of skill in the art should know that the HLB value indicates the polarity of the molecules in a range of 1 to 40 that increases with increasing hydrophilicity of the emulsifier. Given the large variety of invert emulsion emulsifiers available, one of ordinary skill in the art need only do a routine screen of emulsifiers by forming an invert emulsion to select an emulsifier suitable for use in the fluids disclosed herein. In one embodiment, an emulsifier can selected such that after forming the invert emulsion and the addition of a small amount of formic acid will result in the emulsion breaking. Exemplary emulsifiers may include VERSAWET™ and VERSACOAT™, which are commercially available from M-I L.L.C., Houston. Tex. Alternatively, an amine-based acid sensitive emulsifier such as those described in U.S. Pat. Nos. 6,218,342, 6,790,811, and 6,806,233, the contents of which are incorporated by reference herein, may be used. Examples of such emulsifiers are commercially available from M-I L.L.C. of Houston, Tex. under the tradename FAZEMUL Both the invert emulsion fluids and water based wellbore fluids may further contain additional chemicals depending upon the end use of the fluid so long as they do not interfere with the functionality of the fluids described herein. For example, wetting agents, organophilic clays, viscosifiers, fluid loss control agents, surfactants, dispersants, interfacial tension reducers, pH buffers, mutual solvents, thinners, thinning agents, scale inhibition agents, corrosion inhibition agents, cleaning agents and a wide variety of the other components known to one of skill in the art may be added to the fluid compositions of the various embodiments for additional functional properties. The addition of such agents and the reasons for doing so should be well known to one of ordinary skill in the art of formulating drilling fluids (also known as drilling muds), completion fluids, spacer fluids, clean-up fluids, fracturing fluids, and other similar wellbore fluids.

Wetting agents that may be suitable for use in the various embodiments include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art. However, when used with the invert emulsion fluids that undergo a pH controlled phase change, the use of fatty acid wetting agents should be minimized so as to not adversely affect the reversibility of such invert emulsions as disclosed herein. Faze-Wet™, VersaCoat™, SureWet™, Versawet™ and Versawet™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers. Other viscosifiers, such as oil soluble polymers, polyamide resins, polycarboxylic acids and soaps may also be useful. The amount of viscosifier used in the composition can vary upon the end use of the composition. However, normally about 0.1% to 6% by weight range is sufficient for most applications. VG-69™ and VG-PLUS™ and VG-Supreme are organoclay materials distributed by M-I, L.L.C., Houston, Tex., and Versa-HRP™ is a polyamide resin material manufactured and distributed by M-I, L.L.C., that may be used in the various embodiments. Other examples of commercially available compounds include the Bentone™ line of products produced by Rheox as well as similar such materials widely known and available in the drilling fluids industry.

Suitable thinners that may be used in the breaker fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing fluid properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene (a cyclic terpene). The cleaning ability of d-limonene in well drilling applications is disclosed in U.S. Pat. No. 4,533,487, and in combination with various specialty surfactants in U.S. Pat. No. 5,458,197, the contents of which are incorporated herein.

Other than as disclosed herein, the methods used in preparing both the water-based and invert emulsion wellbore fluids utilized in the methods of the present disclosure are not critical. Specifically, with respect to the invert emulsion fluids, conventional methods can be used to prepare the invert emulsion fluids in a manner analogous to those normally used to prepare oil-based drilling fluids. In one representative procedure, a desired quantity of oleaginous fluid, such as C16-C18 internal olefin, is mixed with the selected water in oil emulsifier, a viscosifying agent, and a wetting agent. The internal non-oleaginous phase is prepared by combining a polar organic co-solvent, an immino diacetic acid salt and a hydrolysable ester into the selected brine with continuous mixing. An invert emulsion is formed by vigorously agitating, mixing, or shearing the oleaginous fluid and the non-oleaginous fluid in a conventional manner to form the invert emulsion.

The breaker fluids disclosed herein may be used in various embodiments as a displacement fluid and/or a wash fluid. A displacement fluid is typically used to physically push another fluid out of the wellbore, and a wash fluid typically contains a surfactant and may be used to physically and chemically remove drilling fluid reside from downhole tubulars and/or the residual filtercake in the open hole. In some embodiments, the viscosity of the breaker fluids will be sufficiently high such that the breaker fluid may exhibit a dual role and act as its own displacement pill in a well. For example, the breaker fluid circulated with additives of an invert emulsion as disclosed herein may act as a push pill or displacement fluid to effectively displace the invert emulsion drilling mud. In certain embodiments, the breaker fluid may act as a displacement fluid to effectively displace brine from the wellbore. In yet another embodiment, the breaker fluid may further be used as a wash fluid to physically and/or chemically remove the invert emulsion filter cake once the filter cake has been disaggregated by the breaker system.

In one embodiment, a breaker fluid as disclosed herein may be utilized in a method of cleaning a wellbore that has been drilled with either a water-based drilling mud or an invert emulsion based drilling mud. One of skill in the art will appreciate that in such instances a water-based filter cake or an invert emulsion filter cake will be formed on the face of the wellbore. The breaker fluid may be circulated into the wellbore, contacting the filter cake and any residual mud present downhole. The breaker fluid can be allowed to remain in the downhole environment until such time as the well is brought into production. The breaker fluid may also be circulated in a wellbore that is to be used as an injection well to serve the same purpose (i.e. remove the residual mud and filter cake) prior to the well being used for injection of materials (such as water surfactants, carbon dioxide, natural gas, cuttings, etc. . . . ) into the subterranean formation.

If a wellbore that has already begun production of hydrocarbons (or injection operations) and it is believed to be impaired by any residual filter cake left in the well following the drilling operations, a breaker fluid of the various embodiments may be used to clean the wellbore. In such a case, remedial operations will be necessary to place the breaker fluid into the downhole environment. For example a work over rig can utilize coiled tubing to conduct such remedial activity as one of skill in the art should appreciate. Thus the fluids disclosed herein may be used in work over operations and other remedial well activity.

Generally, a well is often "completed" to allow for the flow of hydrocarbons out of the formation and up to the surface. One of skill in the art should appreciate that completion processes may include the strengthening the well hole with casing, evaluating the pressure and temperature of the formation, and installing the proper completion equipment to ensure an economic flow of hydrocarbons out of the well or in the case of injector well allow the injection of gas or aqueous fluids into the subterranean formation. Completion operations may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, a open hole gravel pack, or casing.

Another embodiment, involves a method of cleaning up a well bore drilled with the invert emulsion drilling fluid described above. In one such illustrative embodiment, the method involves circulating the breaker fluid with an aqueous fluid in a wellbore, which has been drilled to a larger size (i.e., under reamed) with an invert emulsion drilling mud, and then shutting in the well for a predetermined amount of time. During such time period, the invert emulsion based filter cake breaks, thus forming two phases, and oil phase and a water phase. These two phases can be easily produced from the well bore upon initiation of production and thus the residual drilling fluid is easily removed from the well bore.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be circulated in the well, and the well is then shut in for a predetermined period of time. During this time period, the filter cake is dispersed/degraded/broken down. In some instances, such as when an invert emulsion based drilling mud was used in the under-reaming process, the breaker fluid may be combined with additives designed to form two phases, an oil phase and a water phase which can easily produced from the wellbore upon initiation of production. Regardless of the fluid used to conduct the under-reaming operation, the breaker fluids disclosed herein effectively degrade the filtercake and substantially remove the residual drilling fluid from the wellbore upon initiation of production.

It should be appreciated that the amount of delay between the time when a breaker fluid according to the various embodiments is introduced to a well and the time when the fluids have had the desired effect of breaking/degrading/dispersing the filter cake may depend on several variables. As previously discussed, the delay between combining the breaker fluid with the aqueous fluid and their circulation in the wellbore alters the effectiveness of the breaker fluid. One of skill in the art should appreciate that additional factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the lime of efficacy of for a given formulation of the breaker fluids disclosed herein. With such information one can predetermine the time period necessary to shut-in a well given a specific downhole temperature and a specific formulation of the breaker fluid.

However, it should also be appreciated that the breaker fluid formulation itself and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid may be greater than 1 hour. In various other embodiments, the amount of delay for an invert emulsion filter cake to be broken with a water-based displacement fluid according to the present invention may be greater than 3 hours, 5 hours, or 10 hours. Thus the formulation of the fluid can be varied to achieve a predetermined break time and downhole temperature.

One of skill in the art should appreciate that in one embodiment, the amount of delay for a water based filter cake to be broken with a breaker fluid may be greater than 15 hours. In various other embodiments, the amount of delay for an water-based filter cake to be broken with a breaker fluid may be greater than 24 hours, 48 hours, or 72 hours. In one embodiment, the amount of delay for an invert emulsion filter cake to be broken with a breaker fluid may be greater than 15 hours. In various other embodiments, the amount of delay for an invert emulsion filter cake to be broken with a breaker fluid may be greater than 24 hours, 48 hours, or 72 hours.

The following examples demonstrate the effectiveness of the fluids and methods disclosed herein:

Example 1

In Example 1, testing was designed to replicate calcium formate salt precipitation in divalent brines noted in the field. Neat ECF-974 was added to divalent brines, $CaCl_2$ and $CaBr_2$, in varied density ranges using % volume concentrations of ECF-974 in brine, 35:65 & 45:55 to replicate typical breaker volume loadings. ECF-974 is a non-aqueous fluid including the hydrolysable esters of carboxylic acid, ethanediol monoformate and ethylene glycol diformate. The $CaBr_2$ brine testing series included densities of 11.0 lb/gal to 14.0 lb/gal in 0.5 lb/gal step increments. Meanwhile, the $CaCl_2$ brine testing series include densities of 9.5 lb/gal to 11.5 lb/gal in 0.5 lb/gal step increments. Fluids were formulated and heat aged at 180° F. and compatibility, etc., was noted after 4 hours, 24 hours, and 72 hours. The results are shown in Table 1.

TABLE 1

| | ECF 974 Brine Compatibility | | | | | | | |
|---|---|---|---|---|---|---|---|---|
| | $CaCl_2$ Series | 9.0 PPG $CaCl_2$ | 9.5 PPG $CaCl_2$ | 10.0 PPG $CaCl_2$ | 10.5 PPG $CaCl_2$ | 11.0 PPG $CaCl_2$ | 11.5 PPG $CaCl_2$ | 11.6 PPG $CaCl_2$ |
| | | | | 35% v/v ECF 974 | | | | |
| ECF 974 | ml | 7.0 | 7.0 | 7.0 | 7.0 | 7.0 | 7.0 | 7.0 |
| CaCl2 Base Brine | ml | 13.0 | 13.0 | 13.0 | 13.0 | 13.0 | 13.0 | 13.0 |
| Post 1 hr @ 180 F. | compatibility | clear, transparent | clear, transparent | clear, transparent | clear, transparent | clear, transparent | clear, transparent | PRECIP noted |
| Post 24 hours @ 180 F. | compatibility | clear, transparent | clear, transparent | clear, transparent | clear, transparent | clear, transparent | PRECIP noted | PRECIP noted |

TABLE 1-continued

ECF 974 Brine Compatibility

45% v/v ECF 974

| | | | | | | | | |
|---|---|---|---|---|---|---|---|---|
| ECF 974 | ml | 9.0 | 9.0 | 9.0 | 9.0 | 9.0 | 9.0 | 9.0 |
| CaCl2 Base Brine | ml | 11.0 | 11.0 | 11.0 | 11.0 | 11.0 | 11.0 | 11.0 |
| Post 1 hr @ 180 F. | compatibility | clear, transparent | clear, transparent | clear, transparent | clear, transparent | clear, transparent | clear, transparent | PRECIP noted |
| Post 24 hours @ 180 F. | compatibility | clear, transparent | clear, transparent | clear, transparent | clear, transparent | clear, transparent | PRECIP noted | PRECIP noted |
| Ca+ mg/L in Base Brine | | 38,400 | 67,900 | 98,200 | 129,400 | 161,400 | 194,400 | 201,100 |

| | CaBr$_2$ Series | 11.0 PPG CaBr2 | 11.5 PPG CaBr2 | 12.0 PPG CaBr2 | 12.5 PPG CaBr2 | 13.0 PPG CaBr2 | 13.5 PPG CaBr2 | 14.0 PPG CaBr2 | 14.2 PPG CaBr2 |
|---|---|---|---|---|---|---|---|---|---|

35% v/v ECF 974

| | | | | | | | | |
|---|---|---|---|---|---|---|---|---|
| ECF 974 | ml | 7.0 | 7.0 | 7.0 | 7.0 | 7.0 | 7.0 | 7.0 | 7.0 |
| CaBr2 Base Brine | ml | 13.0 | 13.0 | 13.0 | 13.0 | 13.0 | 13.0 | 13.0 | 13.0 |
| Post 1 hr @ 180 F. | compatibility | clear, transparent | clear, transparent | clear, transparent | clear, transparent | clear, transparent | clear, transparent | clear, transparent | clear, transparent |
| Post 24 hours @ 180 F. | compatibility | clear, transparent | clear, transparent | clear, transparent | clear, transparent | clear, transparent | PRECIP noted | clear, transparent | clear, transparent |

45% v/v ECF 974

| | | | | | | | | |
|---|---|---|---|---|---|---|---|---|
| ECF 974 | ml | 9.0 | 9.0 | 9.0 | 9.0 | 9.0 | 9.0 | 9.0 | 9.0 |
| CaBr2 Base Brine | ml | 11.0 | 11.0 | 11.0 | 11.0 | 11.0 | 11.0 | 11.0 | 11.0 |
| Post 1 hr @ 180 F. | compatibility | clear, transparent | clear, transparent | clear, transparent | clear, transparent | clear, transparent | clear, transparent | clear, transparent | clear, transparent |
| Post 24 hours @ 180 F. | compatibility | clear, transparent | clear, transparent | clear, transparent | clear, transparent | clear, transparent | clear, transparent | clear, transparent | clear, transparent |
| Ca$^+$ mg/L in Base Brine | | 83,400 | 99,300 | 115,200 | 131,200 | 147,300 | 163,500 | 179,800 | 186,300 |

No calcium formate precipitation was noted in any fluids after 4 hours. However, after 24 hours, calcium formate precipitation was noted in both volume % fluids using 11.5 lb/gal CaCl$_2$ brine. Fluids were allowed to continue aging for 72 hours @ 180° F. and calcium formate precipitation seemed to increase over time in the 11.5 lb/gal CaCl$_2$ fluids. In addition, no precipitation was noted in the other fluids after 72+ hours. The Ca+ hardness in 11.5 lb/gal CaCl$_2$ is 194,400 mg/L, while that of a saturated CaBr$_2$ is 186,300 mg/L. Compatibility in 14.2 lb/gal CaBr$_2$ brine was also tested, with no precipitation after 1 week. This indicates that calcium formate precipitation forms in ECF-974 with brine above 194,000 mg/L Ca+.

Example 2

In Example 2, testing was conducted to determine if dry NaH$_3$-GLDA could be premixed with neat ECF-974 to simplify rig mixing and mitigate the precipitation of calcium formate. It was determined that NaH$_3$-GLDA could be mixed to maximum concentration of 35 wt % in neat ECF-974. However, above 25 wt %, fluid viscosity increases substantially and requires moderate heat (100° F.) to promote complete dissolution. Fluids were transparent and light amber colored with intensity increasing with increasing wt % NaH$_3$-GLDA. No incompatibilities were observed. It should be noted that the addition of NaH$_3$-GLDA to neat ECF-974 is mildly exothermic. Fluids were heat aged for 5 days at 180° F. with no incompatibility noted. In addition, initial and post heat aged pH's were measured and remained stable, indicating no change or chemical reaction by the addition of NaH$_3$-GLDA to neat ECF-974. Additionally, several tests were performed where ECF-1840 was added to ECF-974 with and without the additional of NaH$_3$-GLDA, in concentrations ranging from 0.5 (v/v) to 2% (v/v). The tests showed no premature hydrolysis of ECF-974 by the addition ECF-1840. The results are shown in Table 2.

TABLE 2

| | 5 wt % GLDA in 974 | 10 wt % GLDA in 974 | 15 wt % GLDA in 974 | 20 wt % GLDA in 974 | 25 wt % GLDA in 974 | 30 wt % GLDA in 974 | 35 wt % GLDA in 974 |
|---|---|---|---|---|---|---|---|
| NaH3 GLDA in Neat D-Structor (ECF 974) Formulations | | | | | | | |
| ECF 974 (grams/ml) | 10/8.69 | 10/8.69 | 10/8.69 | 10/8.69 | 10/8.69 | 10/8.69 | 10/8.69 |
| NaH3 GLDA (grams) | 0.53 | 1.11 | 1.77 | 2.5 | 3.33 | 4.29 | 5.39 |
| ECF 1840 (ml) | X | X | X | X | X | X | X |
| Initial pH | 4.21 | 4.33 | 4.51 | 4.69 | 4.71 | * | * |
| Post 5 day pH | 4.3 | 4.38 | 4.55 | 4.72 | 4.78 | * | * |

TABLE 2-continued

|  | 5 wt % GLDA in 974 | 10 wt % GLDA in 974 | 15 wt % GLDA in 974 | 20 wt % GLDA in 974 | 25 wt % GLDA in 974 | 30 wt % GLDA in 974 | 35 wt % GLDA in 974 |
|---|---|---|---|---|---|---|---|
| NaH3 GLDA in Neat D-Structor (ECF 974) w/.5% v/v ECF 1840 Formulations | | | | | | | |
| ECF 974 w/NaH3 GLDA (ml) | 19.9 | 19.9 | 19.9 | 19.9 | 19.9 | 19.9 | 19.9 |
| ECF 1840 (ml) | 0.1 | 0.1 | 0.1 | 0.1 | 0.1 | 0.1 | 0.1 |
| Initial pH | 4.21 | 4.33 | 4.51 | 4.69 | 4.71 | * | * |
| Post 5 day pH | 4.26 | 4.42 | 4.55 | 4.72 | 4.78 | * | * |
| NaH3 GLDA in Neat D-Structor (ECF 974) w/1.0% v/v ECF 1840 Formulations | | | | | | | |
| ECF 974 w/NaH3 GLDA (ml) | 19.8 | 19.8 | 19.8 | 19.8 | 19.8 | 19.8 | 19.8 |
| ECF 1840 (ml) | 0.2 | 0.2 | 0.2 | 0.2 | 0.2 | 0.2 | 0.2 |
| Initial pH | 4.21 | 4.33 | 4.51 | 4.69 | 4.71 | * | * |
| Post 5 day pH | 4.3 | 4.41 | 4.53 | 4.71 | 4.78 | * | * |
| NaH3 GLDA in Neat D-Structor (ECF 974) w/2.0% v/v ECF 1840 Formulations | | | | | | | |
| ECF 974 w/NaH3 GLDA (ml) | 19.6 | 19.6 | 19.6 | 19.6 | 19.6 | 19.6 | 19.6 |
| ECF 1840 (ml) | 0.4 | 0.4 | 0.4 | 0.4 | 0.4 | 0.4 | 0.4 |
| Initial pH | 4.21 | 4.33 | 4.51 | 4.69 | 4.71 | * | * |
| Post 5 day pH | 4.3 | 4.35 | 4.53 | 4.71 | 4.74 | * | * |

Example 3

In Example 3, tests were performed using varied wt % NaH$_3$-GLDA in ECF-974, in the presence of 11.5 lb/gal CaBr$_2$ brine, with and without the addition or ECF-1840 in various concentrations. This testing was intended to replicate conditions observed in the field. The fluid formulations also contained FAZEMUL, which alone presented mild turbidity in neat 11.5 lb/gal CaBr$_2$ brine. The test fluid formulations are shown in Table 3. Initial compatibility was noted and fluids heat aged at 180° F. for 5 days with no incompatibility or precipitation observed. After 24 hours, fluids were all transparent and remained compatible for 5 days @ 180° F.

TABLE 3

| NaH3 GLDA + Neat D-Structor (ECF 974) w/o ECF 1840 in 11.5 CaBr2 Brine | 5 wt % GLDA in 974 ml | 10 wt % GLDA in 974 ml | 15 wt % GLDA in 974 ml | 20 wt % GLDA in 974 ml | 25 wt % GLDA in 974 ml |
|---|---|---|---|---|---|
| 11.5 CaBr2 Brine (60% v/v) | 15 | 15 | 15 | 15 | 15 |
| FAZEMUL (5% v/v) | 1.25 | 1.25 | 1.25 | 1.25 | 1.25 |
| ECF 974 w/NaH3 GLDA (35% v/v) | 8.75 | 8.75 | 8.75 | 8.75 | 8.75 |
| ECF 1840 | X | X | X | X | X |

| NaH3 GLDA + Neat D-Structor (ECF 974) w/.05% v/v ECF 1840 in 11.5 CaBr2 Brine | 5 wt % GLDA in 974 w/.05% v/v ECF 1840 ml | 10 wt % GLDA in 974 w/.05% v/v ECF 1840 ml | 15 wt % GLDA in 974 w/.05% v/v ECF 1840 ml | 20 wt % GLDA in 974 w/.05% v/v ECF 1840 ml | 25 wt % GLDA in 974 w/.05% v/v ECF 1840 ml |
|---|---|---|---|---|---|
| 11.5 CaBr2 Brine (60% v/v) | 15 | 15 | 15 | 15 | 15 |
| FAZEMUL (5% v/v) | 1.25 | 1.25 | 1.25 | 1.25 | 1.25 |
| ECF 974 w/NaH3 GLDA (35% v/v) | 8.71 | 8.71 | 8.71 | 8.71 | 8.71 |
| ECF 1840 | 0.04 | 0.04 | 0.04 | 0.04 | 0.04 |

| NaH3 GLDA + Neat D-Structor (ECF 974) w/1% v/v ECF 1840 in 11.5 CaBr2 Brine | 5 wt % GLDA in 974 w/1% v/v ECF 1840 ml | 10 wt % GLDA in 974 w/1% v/v ECF 1840 ml | 15 wt % GLDA in 974 w/1% v/v ECF 1840 ml | 20 wt % GLDA in 974 w/1% v/v ECF 1840 ml | 25 wt % GLDA in 974 w/1% v/v ECF 1840 ml |
|---|---|---|---|---|---|
| 11.5 CaBr2 Brine (60% v/v) | 15 | 15 | 15 | 15 | 15 |
| FAZEMUL (5% v/v) | 1.25 | 1.25 | 1.25 | 1.25 | 1.25 |
| ECF 974 w/NaH3 GLDA (35% v/v) | 8.66 | 8.66 | 8.66 | 8.66 | 8.66 |
| ECF 1840 | 0.09 | 0.09 | 0.09 | 0.09 | 0.09 |

TABLE 3-continued

| NaH3 GLDA + Neat D-Structor (ECF 974) w/2% v/v ECF 1840 in 11.5 CaBr2 Brine | 5 wt % GLDA in 974 w/2% v/v ECF 1840 ml | 10 wt % GLDA in 974 w/2% v/v ECF 1840 ml | 15 wt % GLDA in 974 w/2% v/v ECF 1840 ml | 20 wt % GLDA in 974 w/2% v/v ECF 1840 ml | 25 wt % GLDA in 974 w/2% v/v ECF 1840 ml |
|---|---|---|---|---|---|
| 11.5 CaBr2 Brine (60% v/v) | 15 | 15 | 15 | 15 | 15 |
| FAZEMUL (5% v/v) | 1.25 | 1.25 | 1.25 | 1.25 | 1.25 |
| ECF 974 w/NaH3 GLDA (35% v/v) | 8.58 | 8.58 | 8.58 | 8.58 | 8.58 |
| ECF 1840 | 0.18 | 0.18 | 0.18 | 0.18 | 0.18 |

Example 4

In Example 4, tests were performed using several breaker fluid formulations having varied wt % NaH$_3$-GLDA in ECF-974 in the presence of 11.5 lb/gal CaBr$_2$ brine and 10.4 lb/gal FAZEPRO filtercake. The 10.4 lb/gal FAZEPRO includes 0.408 bbls of CaCl$_2$. FAZEPRO filtercakes were generated for 16 hours at ambient temperature on paper and cut into 1"×1" squares. Filtercake segments were placed in screening vials and 15 ml of each designated breaker formulation was gently added. Samples were heat aged at 180° F. for 72 hours, with observations made initially, post 4 hours, and post 72 hours. After 4 hours, breaker treatments were observed and evidence of filtercake degradation was noted for each fluid, with neat ECF-974 in brine being the most aggressive. After 72 hours, fluids were removed and filtercake clean-up potential was noted. The results are shown in Table 4.

TABLE 4

Breaker Bottle Testing w/10.4 PPG FAZEPRO Filtercake (15 ml Breaker volume)

| | Baseline ECF 974 ml | 5 wt % GLDA in 974 ml | 10 wt % GLDA in 974 ml | 25 wt % GLDA in 974 ml |
|---|---|---|---|---|
| 11.5 CaBr2 Brine (54% v/v) | 8.1 | 8.1 | 8.1 | 8.1 |
| Neat ECF 974 | 6.0 | X | X | X |
| ECF 974 w/5 wt % NaH3 GLDA (40% v/v) | X | 6.0 | X | X |
| ECF 974 w/10 wt % NaH3 GLDA (40% v/v) | X | X | 6.0 | X |
| ECF 974 w/25 wt % NaH3 GLDA (40% v/v) | | | | 6.0 |
| ECF 1840 (1% v/v in ECF 974) | X | X | X | X |
| EGMBE (5% v/v) | 0.75 | 0.75 | 0.75 | 0.75 |
| FAZEMUL (1% v/v) | 0.15 | 0.15 | 0.15 | 0.15 |
| 1" × 1" Filtercake Clean-up Efficiency | Filtercake gone but, significant Calcium Formate precip, turbid | Filtercake gone, slight residual, mildly turbid | Filtercake gone, no residue, transparent with mild turbidity | Minimal dispersible filtercake residue, turbid |
| Post 3 day pH | 2.22 | 2.38 | 2.36 | 2.36 |

In the formulation containing neat ECF-974, a white, salt precipitation (calcium formate) was noted, although the filtercake was completely removed and the spent breaker treatment turbid. The 5 wt % NaH$_3$-GLDA in ECF-974 formulation was also transparent but had slight residual solids on bottom of vial. The addition of 1% v/v ECF-1840 to 5 wt % NaH$_3$-GLDA (in Example 5 below) seemed to improve the clean-up potential with negligible residual. The 10 wt % NaH$_3$-GLDA formulation showed no residual cake and was the best case scenario in filtercake clean-up, in regard to residual and spent breaker fluid turbidity. The 25 wt % NaH$_3$-GLDA formulations contained very little residual filtercake. Post 72 hour pH readings were taken for each breaker formulation and all were ~2.2 to 2.4, indicating complete hydrolysis of ECF-974.

Example 5

In Example 5, tests were performed using several breaker fluid formulations including ECF-974, ECF-1840, and in some cases, NaH$_3$-GLDA. The tests we conducted in the presence of 11.5 lb/gal CaBr$_2$ brine and 10.4 lb/gal FAZEPRO filtercake. The 10.4 lb/gal FAZEPRO includes 0.408 bbls of CaCl$_2$. FAZEPRO filtercakes were generated for 16 hours at ambient temperature on paper and cut into 1"×1" squares. Filtercake segments were placed in screening vials and 15 ml of each designated breaker formulation was gently added. Samples were heat aged at 180° F. for 72 hours, with observations made initially, post 4 hours, and post 72 hours. After 4 hours, breaker treatments were observed and evidence of filtercake degradation was noted for each fluid, with neat ECF-974 in brine being the most aggressive. After 72 hours, fluids were removed and filtercake clean-up potential was noted. The results are shown in Table 5.

TABLE 5

Breaker Bottle Testing w/10.4 PPG FAZEPRO Filtercake (15 ml Breaker volume)

| | Baseline ECF 974 w/1840 ml | 5 wt % GLDA in 974 w/1% v/v ECF 1840 ml | 10 wt % GLDA in 974 w/1% v/v ECF 1840 ml |
|---|---|---|---|
| 11.5 CaBr2 Brine (54% v/v) | 8.1 | 8.1 | 8.1 |
| Neat ECF 974 | 5.94 | X | X |
| ECF 974 w/5 wt % NaH3 GLDA (40% v/v) | X | 5.94 | X |
| ECF 974 w/10 wt % NaH3 GLDA (40% v/v) | X | X | 5.94 |
| ECF 974 w/25 wt % NaH3 GLDA (40% v/v) | | | |
| ECF 1840 (1% v/v in ECF 974) | 0.06 | 0.06 | 0.06 |
| EGMBE (5% v/v) | 0.75 | 0.75 | 0.75 |
| FAZEMUL (1% v/v) | 0.15 | 0.15 | 0.15 |

TABLE 5-continued

| | Breaker Bottle Testing w/10.4 PPG FAZEPRO Filtercake (15 ml Breaker volume) | | |
|---|---|---|---|
| | Baseline ECF 974 w/1840 ml | 5 wt % GLDA in 974 w/1% v/v ECF 1840 ml | 10 wt % GLDA in 974 w/1% v/v ECF 1840 ml |
| 1" × 1" Filtercake Clean-up Efficiency | Filtercake gone, clear and transparent, no precip | Filtercake gone, clear, transparent | Negligible residue, transparent with mild turbidity |
| Post 3 day pH | 2.16 | 2.37 | 2.40 |

As shown in Table 5, the formulation including ECF-974 and ECF-1840 (without a chelant) was effective for filtercake clean-up, without any significant precipitation of calcium formate. The combinations of ECF-974 with ECF-1840 and NaH₃-GLDA were also effective. Notably, the addition of 1% v/v ECF-1840 to 5 wt % NaH₃-GLDA in Example 4 above seemed to improve the clean-up potential with negligible residual.

Further, while reference has been made to particular applications for the breaker, displacement and completion fluids of the various embodiments, it is expressly within the scope of the present invention that these fluids may be in used in a variety of well applications. Specifically, the fluids may be used in both producing and injection wells, and may have further application in remedial clean-up of wells.

Advantageously, various embodiments provide for a wellbore fluid that may degrade disperse/break down a filter cake and substantially remove such filter cake without inflicting damage on the surrounding formation. A delay in the dissolution of the filter cake may be achieved by controlling the effectiveness and reactivity of the chemical compositions of the breaker fluids disclosed herein. The chemical properties of the fluids disclosed herein may allow for the degradation of a water-based filter cake and the dissolution of acid soluble bridging materials in the filter cake. The chemical properties of the fluids disclosed herein may also allow for the degradation of the emulsion of the invert emulsion filter cake and the dissolution of acid soluble bridging materials in the filter cake. The displacement and breaker fluids disclosed herein may be effectively used with either conventional invert emulsion or reversible invert emulsion drilling fluid filter cakes as noted above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A breaker fluid comprising:
   a hydrolysable ester of carboxylic acid;
   a chelant; and
   an amount of water wherein the weight ratio of water to hydrolysable ester of carboxylic acid is less than 1.3 to 1, wherein the hydrolysable ester of carboxylic acid, the chelant, and the water are pre-mixed prior to circulating in a wellbore.

2. The breaker fluid of claim 1 wherein the hydrolysable ester of carboxylic acid is a formic acid ester of a C2 to C30 alcohol.

3. The breaker fluid of claim 1 wherein the hydrolysable ester of carboxylic acid comprises ethanediol monoformate.

4. The breaker fluid of claim 1 wherein the chelant comprises one or more chelants selected from a group consisting of: ethylenediaminetetraacetic acid; glutamic acid, N, N-diacetic acid; and salts thereof.

5. The breaker fluid of claim 1 wherein the chelant comprises at least one iminodiacetic acid or a salt thereof, represented by the formula

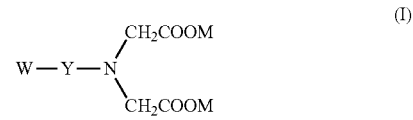

(I)

wherein the M groups each independently represents a hydrogen atom, an alkali metal atom, an ammonium group or a substituted ammonium group; Y represents a divalent alkyl group having from 1 to 7 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group.

6. The breaker fluid of claim 1 wherein the breaker fluid comprises 0 wt %-10 wt % water.

7. The breaker fluid of claim 1 further comprising an alkyl glycoside.

8. A breaker base fluid comprising:
   a formic acid ester of a C2 to C30 alcohol;
   one or more chelants selected from a group consisting of: ethylenediaminetetraacetic acid; glutamic acid; N, N-diacetic acid; and salts thereof; and
   an amount of water where the weight ratio of water to hydrolysable ester of carboxylic acid is less than 1.3 to 1.

9. The breaker fluid of claim 8 comprising 5-35 wt % chelants.

10. The breaker fluid of claim 8 comprising 0 wt %-10 wt % water.

* * * * *